United States Patent [19]
Barber et al.

[11] 3,898,048
[45] Aug. 5, 1975

[54] LIGHT-WEIGHT ROCKET DEPLOYABLE GAS GENERATOR

[75] Inventors: William H. Barber, Brandywine, Md.; Werner F. Beckert, Las Vegas, Nev.; Ottmar H. Dengel, Front Royal, Va.

[73] Assignee: The United States of America as represented by the Secretary of the Navy, Washington, D.C.

[22] Filed: Mar. 21, 1974

[21] Appl. No.: 453,662

[52] U.S. Cl. ............ 23/281; 23/252 R; 102/39; 102/70 R; 252/188
[51] Int. Cl. .................. B01j 7/00; B60r 21/00
[58] Field of Search ............ 23/281; 252/188

[56] References Cited
UNITED STATES PATENTS

| | | | |
|---|---|---|---|
| 2,558,756 | 7/1951 | Jackson et al. | 23/281 |
| 3,305,319 | 2/1967 | Kowalick et al. | 23/281 |
| 3,558,285 | 1/1971 | Ciccone et al. | 23/281 |
| 3,733,180 | 5/1973 | Heineck et al. | 23/281 |
| 3,734,863 | 5/1973 | Beckert et al. | 252/188 |

*Primary Examiner*—James H. Tayman, Jr.
*Attorney, Agent, or Firm*—R. S. Sciascia; J. A. Cooke

[57] ABSTRACT

A compact, light weight gas generator employing the reaction of a solid grain mixture initiated by a primer. Gases evolved are cooled and filtered through a series of filter disks.

9 Claims, 1 Drawing Figure

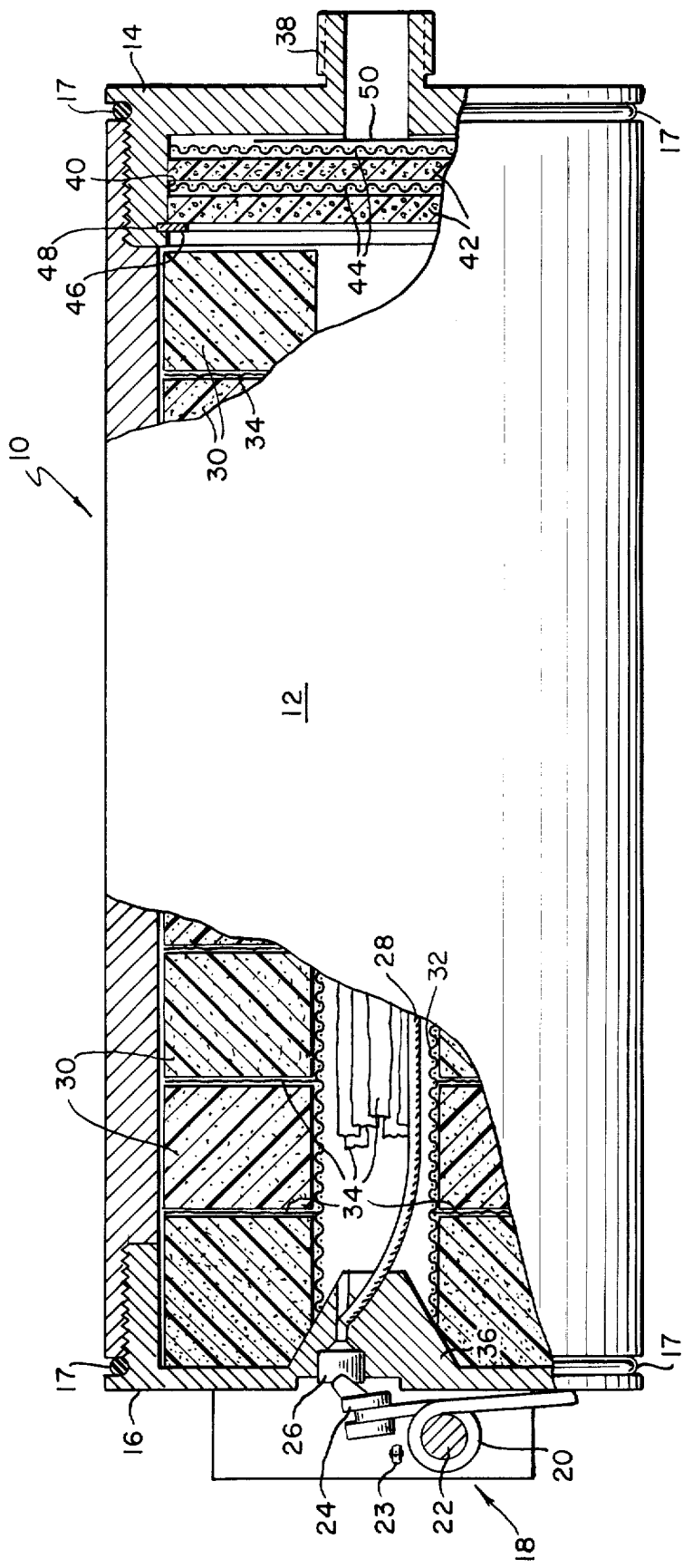

LIGHT-WEIGHT ROCKET DEPLOYABLE GAS GENERATOR

BACKGROUND OF THE INVENTION

The instant invention relates generally to gas generators, and more particularly to gas generators utilizing dry, solid grain reactive mixtures which produce lighter-than-air gases, such as hydrogen.

Gas generators in the past have generally relied on the wet reaction of a hydrogen ion donor, such as water or a conventional acid, combined with a reactive metal, such as sodium or lithium. While these reactions are relatively efficient for producing hydrogen gas in a normal environment where water is readily available, such as on the ocean, these reactions are considered inefficient due to the tare weight of the reactants when carried aloft, as by a small rocket. Additional to the weight problem is the requirement of a vessel having sufficient volume capacity for the evolution of gas to obtain a certain inflation pressure, and the mechanisms for combining the hydrogen ion donor and the active metal. In fact it has been found that this system cannot be used in a rocket launched crash and rescue locator balloon system due to the lack of reliability.

Another method of providing a gas for inflation of a balloon is pressurized gas cartridges or cylinders which carry a considerable volume of gas pressurized to 500–1000 psi. However the cylinder must be made of high tensile steel having a considerable thickness to resist bursting, and therefore high tare weight.

The successful development of solid reactive mixtures to produce hydrogen at high evolution rates and relatively low temperatures is described in copending Navy application Ser. No. 152,422 filed June 11, 1971 and now U.S. Pat. No. 3,743,863. The composition used to make solid grain mixtures comprise ammonium salts, such as ammonium chloride ($NH_4Cl$) and complex hydrides, such as lithium aluminum hydride ($LiAlH_4$) and sodium-aluminum hydride ($NaAlH_4$). The reaction of these compositions is dry and exothermic and may be initiated by the heat from a percussion primer much like a pyrotechnic reaction, and produces large quantities of hydrogen gas. The compositions are relatively light in weight and small quantities only need be used to evolve enough gas for filling a balloon, and therefore this method is suitable and a feasible payload for a small rocket. A description of a crash and rescue balloon site marker system using this method may be found in copending Navy application Ser. No. 265,931 filed June 23, 1972 now abandoned, and C.I.P. application Ser. No. 495,479, filed Aug. 7, 1974.

At present there is no known cannister or generator for utilizing the above described dry reaction for producing hydrogen gas. Some of the many problems encountered are that the generator must be compact, light-weight, and capable of withstanding temperatures up to 400°C and pressures up to 1000 psi. It must also contain remote or automatic means for initiation, and gas filtering and cooling means and of course be economical enough to be expendable.

SUMMARY OF THE INVENTION

Accordingly an object of the present invention is to provide a new and improved gas generator.

Another object of the instant invention is to provide a gas generator for the evolution of gas from solid reactive compositions.

Still another object of the present invention is to provide a gas generator capable of withstanding high temperatures and pressures encountered when evolving gases from a solid reactive mixture of compositions.

A further object of the present invention is to provide a compact and light weight cannister-type gas generator for solid reactive compositions.

A still further object of the present invention is to provide a gas generator capable of initiation automatically or remotely.

Briefly these and other objects of the present invention are attained by the use of a light-weight cylindrical tube containing a solid grain reactive mixture of compositions which upon initiation evolve hydrogen gas. An explosive percussion primer and a spring-loaded striker at one end of the cylindrical tube initiates, by a flash of heat, the reaction and a plurality of filters at the other end filter and cool the hydrogen before use, such as inflating a balloon attached to a connection tube on the outside of the cannister. The cannister, balloon, and tether cord may be packaged in a small rocket that may be launched from a tube by hand. The spring-loaded striker may be released near the zenith of the rocket's trajectory by the tether cord pulling out a pin release mechanism. The rocket case may be opened in the same manner to deploy the balloon as it fills with a lighter-than-air gas to act as a site marker for a crashed aircraft.

BRIEF DESCRIPTION OF THE DRAWINGS

A more complete understanding of the invention and many of the attendant advantages thereof will be readily appreciated as the same becomes better understood by reference to the following detailed description when considered in connection with the accompanying drawing wherein:

The FIGURE is a side view, partially cut away, of the gas generator according to the invention.

DESCRIPTION OF THE PREFERRED EMBODIMENT

Referring now to the drawing there is shown generally an assembled gas generator 10 comprising a cylindrical, tubular body 12, a filter end cap 14 and an igniter end cap 16.

The igniter end cap 16 is threadably engaged and sealed with an O-ring 17 to one end of the body 12, and has mounted thereon a striker 18, comprising a spring 20 wound about an axle 22, and a firing pin 24. The firing pin 24 is shown in a released position striking a percussion primer 26, and is normally held back by a release pin 23. Adjacent the inside of the percussion primer 26, is a length of propogation fuze 28, or "SCID" as is well known in the art, extending into the center core of a plurality of grain slugs 30, compressed into a donut shape and containing a hydrogen producing reactive mixture. Also within the core is a mesh wire hollow cylinder 32 containing the propogation fuze 28 and filled with thin strips of a heat paper 34. Separating the grain slugs 30 from one another are circular sheets of a heat paper 34, having concentric holes slightly smaller than the grain core diameter. The grain 30 nearest the igniter end cap 16 has its core wedged on a truncated conical portion 36 of the igniter end cap 16 thereby maintaining the stack of grain slug 30 in slight axial compression against the filter end cap 14.

The filter end cap 14 is threadably engaged and sealed with an O-ring 17 to the other end of the body 12 and has a threaded nozzle connection 38 and a counter bore 40 substantially the same size as the internal diameter of the tubular body 12. Within this counter bore 40 are contained at least two filter discs 42 made of felt metal, glass wool, molecular sieves, sintered metal, or chemical ingredients such as charcoal, and metal hydrides to preclude the flow of entrained debris and to react with undesired gas components, such as water vapor and the like. Interleaved with the filter discs 42, are at least two support grids 44 made of metal screen mesh, for example, to retain particles possibly broken away from the filter discs 42 during the reaction evolving the hydrogen gas. The interleaved filter discs 42 and support grids 44 are retained in the counter bore by a snap ring 46 in an annular groove 48. To protect the contents of the generator 10 from the environment, the gas outlet inside the nozzle 38 is sealed with a frangible membrane 50 made of aluminum foil or the like which is easily ruptured by the pressure build-up inside the generator once the reaction has been initiated.

In operation when the gas generator 10 is utilized in a small, rocket deployed, crash and rescue locator system, a rocket carries aloft the generator and a balloon, while it pays out a tether cord along the trajectory. As the rocket nears its zenith, the tether cord pulls out a pin and the rocket case opens, deploying the balloon and releasing the spring loaded firing pin by pulling the release pin 23. The firing pin strikes the percussion primer 26, and the resultant flash of heat propogates along the "SCID" fuze 28 and thence to the strips of heat paper 34 in the core of the grain slugs 30. The grain slugs 30 are thereby initiated substantially simultaneously, and the circular sheets of heat paper between the slugs maintain the reaction for the rapid and steady evolution of hydrogen gas. The resultant pressure forces the gas through the filters 42 and grids 44, cleaning and cooling the gas, and ruptures the membrane seal 50 to fill a balloon attached to the connection nozzle 38. The emptied gas generator 10 may then be automatically released from the balloon which is now buoyant and floats on its tether cord for ready visual location by a search party.

Obviously, many modifications and variations of the present invention are possible in light of the above teachings. It is therefore to be understood that within the scope of the appended claims the invention may be practiced otherwise than as specifically described.

What is claimed as new and desired to be secured by Letters Patent of the United States is:

1. A compact, light weight gas generator comprising:
   a container;
   a composition within said container capable of producing a gas in the presence of heat;
   means adjacent one end of said container for filtering and cooling the gas produced;
   exit means adjacent said filtering and cooling means for exhausting the gas from said container; and
   means for producing and maintaining the heat for said gas-producing composition, including:
      an explosive primer for producing a flash of heat inside said container;
      means to initiate said primer;
      a fuze adjacent to said primer for transferring the heat; and
   a quantity of heat producing material within a bore in said composition and adjacent to suid fuze for further transfer of the heat and for producing substantially simultaneous initiation of said composition.

2. The gas generator of claim 1 wherein said composition comprises a plurality of disks of solid grains of said composition, each disk having a central perforation forming a bore in said composition.

3. The gas generator of claim 2 further comprising:
   centrally-perforated disks of heat producing material between said disks of gas-producing composition; and
   a perforated cylinder within the bore of said composition to contain said fuze and said quantity of heat producing material.

4. The gas generator of claim 3 wherein said filter means includes:
   a plurality of filter discs which permit the flow of gas to cool the gas and preclude the flow of entrained debris; and
   a plurality of mesh screens interleaved with said filter discs 5. The gas generator of claim 4 further comprising a membrane sealing said exit means until sufficient pressure of the gas produced ruptures the membrane.

6. The gas generator of claim 5 wherein said flammable material comprises heat paper.

7. The gas generator of claim 6 wherein said composition produces hydrogen gas in an exothermic reaction.

8. The gas generator of claim 7 wherein said composition is composed of an ammonium salt and a complex hydride.

9. The gas generator of claim 8 wherein said salt is ammonium chloride and said hydride is lithium aluminum hydride.

* * * * *